(12) United States Patent
Metz et al.

(10) Patent No.: US 6,485,558 B1
(45) Date of Patent: Nov. 26, 2002

(54) PROCESS FOR THE PREPARATION OF PIGMENT GRANULES

(75) Inventors: Hans Joachim Metz, Darmstadt; Heinfred Ohleier, Kelsterbach, both of (DE)

(73) Assignee: Clariant GmbH, Frankfurt (DE)

( * ) Notice: Subject to any disclaimer, the term of this patent is extended or adjusted under 35 U.S.C. 154(b) by 64 days.

(21) Appl. No.: 09/649,532

(22) Filed: Aug. 28, 2000

(30) Foreign Application Priority Data

Aug. 28, 1999 (DE) .......................... 199 41 061

(51) Int. Cl.$^7$ ..................... C09D 17/00; C09D 123/02; C09B 29/02
(52) U.S. Cl. ..................... 106/493; 106/412; 106/413; 106/496; 106/497; 106/498; 106/502
(58) Field of Search ................................. 106/413, 493, 106/496, 497, 498, 502, 412

(56) References Cited

U.S. PATENT DOCUMENTS 4,277,288 A   7/1981   Lawrence et al. .......... 106/413
4,762,523 A * 8/1988   Gawol et al. ................. 8/524
5,173,116 A * 12/1992  Roth ........................... 106/400
6,241,813 B1 * 6/2001  Balliello et al. ............ 106/493

FOREIGN PATENT DOCUMENTS

| DE | 29 40 156   | 4/1980 |
| DE | 39 35 815   | 5/1991 |
| JP | 10-251533 A | 9/1998 |
| WO | WO 92/07912 | 5/1992 |

OTHER PUBLICATIONS

Derwent Patent Family Abstract for DE 39 35 815 (May 1991).
S. R. Iyer and L. T. Drzal, Powder Technology, 57 (1989) 127–133, Behavior of Cohesive Powders in Narrow–Diameter Fluidized Beds (no month).

* cited by examiner

Primary Examiner—Anthony J. Green
(74) Attorney, Agent, or Firm—Richard P. Silverman

(57) ABSTRACT

The invention relates to a process for the preparation of pigment granules, which comprises adding a wax or a waxy polymer to an organic pigment during the finish in an organic or aqueous organic medium and spray-drying the aqueous suspension obtained after removal of the organic solvent by steam distillation or washing out with water.

19 Claims, No Drawings

PROCESS FOR THE PREPARATION OF PIGMENT GRANULES

BACKGROUND OF THE INVENTION

The invention relates to a process for the preparation of an organic colorant composition in granular form, comprising wax-coated organic pigments.

When prepared, organic pigments are generally obtained in the form of powders. Powders comprise very small particles and therefore give rise to a great deal of dust. Dust development leads to the contamination of apparatuses, plants and products, so that expensive and time-consuming cleaning work has to be carried out especially when changing products. Consequently, the pigment processors require the provision of pigment forms which do not produce dust.

For use, pigments must be dispersed in the application medium. If the pigments are present as powder, the dispersing is generally effected with the introduction of a considerable amount of energy, for example for the use of twin-screw extruders in the coloring of plastics. Pigments which are present in a predispersed form are therefore advantageous for the application.

JP 10-251533 describes quinacridone pigments which are brought into a predispersed form by wax coating via an isobutanol finish. The wax-coated quinacridone pigments, which have a particle size of from about 0.05 to 0.3 μm, are used in the form of a powder and thus have the disadvantage of developing dust.

DE-A1-29 40 156 and WO 92/07912 describe processes for the preparation of low-dust, free-flowing pigment granules by using a fluidized-bed method. Blowing air through the pigment powder produces a fluidized bed or fluidized pigment powder, which is sprayed with an aqueous solution, dispersion or emulsion of a granulating assistant.

In another process (DE 39 35 815 C2), the pigment is sprayed with a wax dispersion in a mixer-granulator. These processes have the disadvantage that the pigment is not present in a predispersed form advantageous for subsequent use, since the surface of the pigment particles is only incompletely coated with the wax or the assistant. In addition, it is not possible to fluidize every powder pigment to give a fluidized bed (Powder Technology 57, 127–133 (1989)), so that this method cannot be generally used.

Said processes have the disadvantage that either a predispersed but dust-producing pigment powder (JP 10-251 533) or pigment granules which do not produce dust but are not sufficiently predispersed are prepared. Moreover, the known processes for the preparation of a pigment form which does not produce dust start from prepared pigment powder and therefore give rise to additional operations, which increase the cost.

SUMMARY OF THE INVENTION

It is the object of the present invention to provide a process for the preparation of dustless, flowable and readily dispersible organic pigments, which requires no additional process steps compared with the preparation of the corresponding pigment powder.

It has been found that the disadvantages mentioned in the prior art are surprisingly overcome by spray-drying organic pigments which have been coated with a wax or polymer layer during a finish process to be carried out in the pigment preparation.

DESCRIPTION OF THE PREFERRED EMBODIMENTS

The present invention relates to a process for the preparation of readily dispersible pigment granules, which comprises adding a wax or waxy polymer to an organic pigment during the finish process in an organic or aqueous organic medium, removing the organic solvent of said organic or aqueous organic medium and spraydrying an aqueous suspension of the pigment. Said aqueous suspension may be obtained by steam distillation or washing out with water.

During the finish process, the pigment particles are brought into intimate contact with the wax or waxy polymer. After removal of the solvent by steam distillation, a sprayable aqueous solution is obtained. Nevertheless, it may be expedient to filter the suspension prior to the spray-drying and to remove any salts present by washing and to stir the press cake obtained by the filtration again to give a sprayable suspension. In an expedient procedure for washing out with water, the solid is filtered off and is washed solvent-free with water, and the press cake obtained thereby is diluted with water to give a sprayable suspension.

As a result of the spray-drying, on the one hand, granulation to a suitable particle size is achieved without the coating of the pigment particles with the wax or polymer, achieved during the solvent finish, being damaged. On the other hand, the drying and milling required in the preparation of pigment powders are avoided.

The pigment granules according to the invention have a mean particle diameter of from 0.05 to 5 mm. Granules having particle diameters in the range from 0.1 to 2 mm are particularly preferred. Owing to their generally spherical shape, the granules are flowable and hence readily meterable. Because of their size and weight, the granules produce very little dust.

Suitable organic pigments are, for example, azo pigments, such as monoazo, disazo, naphthol and metal complex pigments, as well as polycyclic pigments, such as isoindolinone and isoindoline pigments, anthanthrone, thioindigo, quinophthalone, anthraquinone, dioxazine, phthalocyanine, quinacridone, perylene, perinone, diketopyrrolopyrrole and azomethine pigments.

Waxes do not have a standard chemical definition and form a group of substances with identical or similar application properties, characterized by particular physical properties. Thus, the term "wax" designates a number of natural or synthetically obtained substances which as a rule have the following properties: kneadable at 20° C., solid to brittly hard, coarse to finely crystalline, translucent to opaque, but not glassy; melting without decomposition above 40° C., relatively low viscosity and nonthread-drawing slightly above the melting point, highly temperature-dependent consistency and solubility, polishable under slight pressure (cf. Ullmanns Encyklopädie der technischen Chemie [Ullmann's Encyclopedia of Industrial Chemistry], Volume 24, 4th Edition, 1983, pages 1–49, Verlag Chemie, Weinheim and Römpps Chemie-Lexikon [Römpp's Chemistry Lexicon], Volume 6, 8th Edition, 1988, page 463, Franck'sche Verlagshandlung).

Preferred waxes are: natural waxes, such as vegetable waxes, e.g. carnauba wax and candellila wax, and animal waxes, e.g. beeswax, modified natural waxes, such as, for example, paraffin waxes, microwaxes, semisynthetic waxes, such as, for example, montan ester waxes, or fully synthetic waxes, such as polyolefin waxes, e.g. polyethylene and polypropylene waxes, polyethylene glycol waxes, cycloolefin copolymer waxes, amide waxes, such as, for example, N,N'-distearylethylenediamine, and chlorine- or fluorine-containing polyolefin waxes or polyethylene-polytetrafluoroethylene wax mixtures.

Polyolefin waxes and polyolefin waxes containing polar groups and formed by subsequent oxidation of the polyolefin wax, by a graft reaction with monomers containing carboxyl, carboxylic ester, carboxylic anhydride or hydroxyl groups or by copolymerization of an olefin and a monomer containing carboxyl, carboxylic ester, carboxylic anhydride or hydroxyl groups, are particularly preferred.

Suitable polymers are relatively high molecular weight compounds which have a waxy character and were preferably prepared by polycondensation or polyaddition processes, for example thermoplastic polyester, epoxide, styrene/acrylate copolymer, styrene/butadiene copolymer and cycloolefin copolymer resins, such as, for example, ®Topas.

In order to have sufficient solubility at elevated temperature in organic solvents, the polymers generally have a number average molecular weight ($\overline{M}_n$) of up to 20,000. Waxes having a number average molecular weight ($\overline{M}_n$) of up to 10,000 are preferred, those having a number average molecular weight ($\overline{M}_n$) of up to 5000 being particularly preferred. The drop point of the waxes used according to the invention or the softening temperature of the polymers is preferably in the range from 60 to 180° C., particularly preferably in the range from 80 to 140° C.

The amount and the type of the wax or polymer may vary depending on the field of use of the pigment granules, in particular to ensure compatibility with the application medium. In order to produce a defined property profile, it is also possible to use a mixture of at least two different waxes or polymers.

Expediently, the organic pigment is used in an amount of from 50 to 99% by weight, preferably from 60 to 95% by weight, and the wax or polymer in an amount of from 1 to 50% by weight, preferably from 5 to 40% by weight, based on the total weight of the pigment granules.

A person skilled in the art understands the term finish process as meaning an aftertreatment of the crude pigment formed in the synthesis, generally in the form of a water-moist press cake, of an aqueous pigment suspension or of a dry pigment, in a finish medium, for example in an organic solvent or a mixture of water and organic solvent, in order to produce a crystal form and/or crystal modification advantageous for the subsequent use. Expediently, a 2 to 30% strength by weight suspension of the crude pigment or crude pigment press cake in the finish medium is stirred, kneaded and/or refluxed, optionally with heating, with the addition of the wax or polymer.

The finish medium chosen is preferably that organic solvent or that mixture of water and inorganic solvent which partially or completely dissolves the wax or polymer used at the finish temperature and can be removed by steam distillation or washing out. Preferred solvents are aliphatic alcohols, such as, for example, n-butanol, isobutanol, n-octanol, isooctanol; aromatic hydrocarbons, such as, for example, benzene, toluene, xylene, cresol, chlorobenzene, 1,2-dichlorobenzene; esters, such as, for example, ethyl acetate, butyl acetate; ketones, such as, for example, methyl ethyl ketone, methyl isobutyl ketone or cyclohexanone; dipolar aprotic solvents, such as, for example, N-methylpyrrolidone, dimethyl sulfoxide or sulfolane. The finish temperatures may be, for example, in the range from 20 to 200° C., preferably from 60 to 180° C. The finish process expediently takes from 1 to 24 hours, preferably from 2 to 10 hours. It may be advantageous to carry out the finish process by a procedure in which first, for example, heating is effected for 1–10 hours to 60 to 200° C., cooling is then effected to 100 to 20° C. and the wax or polymer is added, and heating is then effected again to 60 to 200° C. It is also possible to add the wax or polymer directly to the finish batch during the finish process, i.e. without intermediate cooling.

In the finish process, the usually lipophilic pigment is coated with the organic phase (solvent and wax/polymer). This procedure has the advantage that the pigment is present in finely divided form in the organic phase. Final covering of the pigment surface with wax/polymer is achieved by the removal of the solvent, which is done by steam distillation (temperature e.g. from 80 to 100° C.) or by washing out with water on a filter, expediently at from 20 to 95° C. An aqueous suspension of pigments coated with wax/polymer is then present. The suspension is, if required, adjusted to the desired concentration with water, expediently to a 5 to 30% strength by weight suspension of the pigment coated with wax/polymer, if required homogenized with the aid of a colloid mill or of a comparable unit and then spray-dried to give granules.

In some cases, the addition of a surfactant may be advantageous for optimum wetting of the pigment surface with the wax/polymer. Suitable surfactants are cationic surfactants, such as, for example, quaternary ammonium salts, long-chain alkylamines (in the neutral to slightly acidic pH range); anionic surfactants, such as, for example, carboxylic acids, sulfonic acids, sulfonic esters, such as, for example, sulfosuccinic esters, and salts thereof; amphoteric surfactants, such as, for example, betaines, and nonionic surfactants, such as, for example, sugar alkylates and acylates, ethoxylated sugar alkylates and acylates, glyceryl esters, polyethylene glycol esters, and ethoxylated fatty acids, fatty alcohol ethoxylates and fatty amine ethoxylates. The surfactant can be added before the finish or during the finish process.

Spray towers having an airless high-pressure nozzle or spray towers which carry out pelletizing (e.g. fluidized-bed spray-dryer) are suitable for the spray-drying. In the case of spray towers having an airless high-pressure nozzle, the suspension is sprayed in the form of relatively large drops and the water is evaporated. If the temperatures in the spray towers are above the drop point of the wax/polymer, the wax/polymer melts and levels to spherical granules having a smooth surface.

In the case of FSD spray towers, the suspension is sprayed to give a fine powder. The vigorous fluidization in the fluidized bed and the recirculation of the fine powder particles entrained by the exit air and deposited in an upstream cyclone ensure that the spray-drying takes place in a turbulent powder cloud. This gives rise to a dusting effect and, at tower temperatures above the drop point of the wax/polymer, the particles stick together to give raspberry-like granules. The residual moisture and the granulometry are controlled in the fluidized bed.

The gas inlet temperature in the spray tower is usually in the range from 180 to 300° C., preferably from 190 to 280° C., and the gas outlet temperature is in the range from 70 to 150° C., preferably from 90 to 130° C.

The granules can be used for coloring high molecular weight organic materials. These may be of natural or synthetic origin. They may be, for example, natural resins, drying oils or rubber. However, they may also be modified natural substances, such as, for example, chlorine rubber, cellulose derivatives, such as cellulose esters or cellulose ethers, and in particular fully synthetic organic polymers (plastics) which are prepared by polymerization, polycondensation or polyaddition. From the class consisting of the plastics prepared by polymerization, the following may be mentioned in particular: polyolefins, such as, for example, polyethylene, polyproylene, polyisobutylene, and substituted polyolefins, such as, for example, polystyrene, polyvinyl chloride, polyvinylidene chloride, polyvinyl acetals, polyacrylonitrile, polyacrylic acid, polymethacrylic acid, polyacrylic esters and polymethacrylic esters or polybutadiene, and copolymers thereof. From the class consisting of the plastics prepared by polyaddition and polycondensation, the following may be mentioned: polyesters, polyamides, polyimides, polycarbonates, polyurethanes, polyethers, polyacetals, and the condensates of formaldehyde with phenols (phenoplast) and the condensates of formaldehyde with urea, thiourea and melamine (aminoplasts).

Said high molecular weight organic material may be present individually or as mixtures in the form of plastics materials or melts. It may also be present in the form of its monomers, which are polymerized after coloring.

The pigment granules according to the invention can be used in any ratio which is required for coloring the high molecular weight organic material, usually in amounts from 0.1 to 30% by weight, preferably from 1 to 20% by weight, based on the total weight of the pigmented high molecular weight organic material.

For coloring the high molecular weight organic material, the granules according to the invention may be used alone. For establishing different hues or color effects, it is also possible to add other colorants, such as, for example, white, colored or black pigments, and effect pigments to the high molecular weight organic material, in addition to the granules according to the invention.

The granules are highly concentrated colorants in which the pigments are present in a predispersed form, similar to a masterbatch. No major dispersing work need therefore be performed for coloring the high molecular weight organic material and, for example, thorough mixing of the granules according to the invention with the high molecular weight organic material in roll mills, mixers, other milling units or a singlescrew extruder is sufficient.

EXAMPLES

Example 1

27.1 kg of salt-free, water-moist press cake of unfinished crude pigment P.Y. 180 (corresponds to 7.5 kg of dry pigment) are dispersed in 33.5 kg of water with the aid of a drum stirrer. After the addition of 80.8 kg of isobutanol and 5.0 kg of the polyethylene wax PED 522 (Clariant GmbH), the batch is stirred for 5 hours at 150° C. The finish process and the wax coating of the pigment take place during this procedure. After the finish, the isobutanol is removed by steam distillation, and an aqueous suspension of wax-coated pigment P.Y. 180 is obtained. By adding water, the suspension is adjusted to a solids concentration of 10% by weight, dispersed, and homogenized by passing through a colloid mill. Thereafter, the homogeneous suspension is sprayed in an FSD spray tower and granulated (gas inlet temperature: 190° C.; gas outlet temperature: 100° C.; bed temperature: 75° C.). Pigment granules having a raspberry-like structure are obtained.

The dust behavior of the granules is determined with the aid of sedimentation dust measuring apparatus. The sample falls from a loading system through a drop tube and impacts on a baseplate. The course of sedimentation as a function of time is measured photometrically.

The measurement scale ranges from 0 (does not produce dust) to 16 (considerable dust production).

The dust number is 1.1, whereas the corresponding powder pigment has a dust number of 15.9. The coloristic properties were tested in polyethylene and correspond to the powder type.

Example 2

Procedure as in Example 1, but with the following batch:
25.32 kg of moist press cake P.Y. 180 (corresponds to 7.0 kg of dry pigment)
31.10 kg of water
75.54 kg of isobutanol
3.0 kg of wax PED 522 (Clariant GmbH)

The dust number is 0.1. The coloristic properties were tested in polyethylene and correspond to the powder type.

Example 3

Procedure as in Example 1, but with the following batch:
25.32 kg of moist press cake P.Y. 180 (corresponds to 7.0 kg of dry pigment)
30.50 kg of water
76.09 kg of isobutanol
3.0 kg of wax PE 890 (copolymer of vinyl acetate and ethylene)

The coloristic properties were tested in polyethylene and correspond to the powder type.

Example 4

27.1 kg of salt-free, water-moist press cake of the unfinished crude pigment P.Y. 180 (corresponds to 7.5 kg of dry pigment) are dispersed in 33.5 kg of water with the aid of a drum stirrer. After the addition of 80.8 kg of isobutanol and 5.0 kg of the polyethylene wax PED 522 (Clariant GmbH), the batch is stirred for 5 hours at 150° C. The finish process and the wax coating of the pigment take place during this procedure. After the finish, the isobutanol is removed by steam distillation, and an aqueous suspension of wax-coated pigment P.Y. 180 is obtained.

By adding water, the suspension is adjusted to a solids concentration of 10% by weight, dispersed, and homogenized by passing through a colloid mill. The homogeneous suspension is then sprayed in a spray tower having an airless highpressure nozzle (gas inlet temperature: 260° C.; gas outlet temperature: 120° C.). Spherical pigment granules are obtained. The coloristic properties were tested in polyethylene and correspond to the powder type.

Example 5

27.1 kg of salt-free, water-moist press cake of unfinished crude pigment P.R. 122 (corresponds to 6.1 kg of dry pigment) are dispersed in a mixture of 38.3 kg of isobutanol, 1 kg of 33% strength by weight sodium hydroxide solution and 10.2 kg of water. After the addition of 3.34 kg of the polyethylene wax PED 522 (Clariant GmbH), the pigment is finished for 5 hours at 125° C. The isobutanol is removed by steam distillation, and an aqueous suspension of wax-coated P.R. 122 is obtained.

By adding water, the suspension is adjusted to a solids concentration of 10% by weight, dispersed, and homogenized by passing through a colloid mill. The homogeneous suspension is then sprayed in an FSD spray tower and granulated. The pigment granules having a raspberry-like structure are obtained. The coloristic properties were tested in polyethylene and correspond to the powder type.

Example 6

33.5 kg of salt-free, water-moist press cake (22.2% by weight) of unfinished crude pigment P.O. 72 (corresponds to 7.4 kg of dry pigment) are dispersed in 33.9 kg of ater with the aid a drum stirrer. After the addition of 50.9 kg of isobutanol, the batch is stirred for 3 hours at 160° C. Thereafter, 1.86 kg of ®Licowax PED 121 (Clariant GmbH) are added under pressure and stirring is carried out for a further hour at 160° C. After the finish process, the isobutanol is removed by steam distillation, and an aqueous suspension of wax-coated P.O. 72 is obtained.

The aqueous suspension is homogenized by passing through a colloid mill. The homogeneous suspension is then sprayed in a spray tower having an airless highpressure nozzle (gas inlet temperature: 260° C.; gas outlet temperature: 120° C.). Spherical pigment granules are obtained. The coloristic properties of the granules were tested in polyethylene and correspond to the powder type.

Example 7

35.7 kg of salt-free, water-moist press cake (20.8% by weight) of unfinished crude pigment P.O. 72 (corresponds to 7.4 kg of dry pigment) are dispersed in 31.7 kg of water with the aid of a drum stirrer. After the addition of 50.9 kg of isobutanol, the batch is stirred for 3 hours at 160° C. Thereafter, 1.98 kg of ®Licowax PED 121 (Clariant GmbH) and 4.96 kg of ®Tergitol 15-S-20 (Union Carbide) are added under pressure and stirring is carried out for a further hour at 160° C. After the finish process, the isobutanol is removed by steam distillation, and an aqueous suspension of wax-coated P.O. 72 is obtained. The aqueous suspension is homogenized by passing through a colloid mill. The homogeneous suspension is then sprayed in a spray tower having an airless high-pressure nozzle (gas inlet temperature: 260° C.; gas outlet temperature: 120° C.). Spherical pigment granules are obtained. The coloristic properties of the granules were tested in polyethylene and correspond to the powder type.

Example 8

33.5 kg of salt-free, water-moist press cake of unfinished crude pigment P.O. 72 (corresponds to 7.4 kg of dry pigment) are dispersed in 33.9 kg of water with the aid of a drum stirrer. After the addition of 50.9 kg of isobutanol, the batch is stirred for 4 hours at 160° C. Thereafter, cooling is effected to 80° C. and 1.86 kg of ®Licolub WE 40 (Clariant GmbH) are added and refluxing is carried out for 30 minutes while stirring. Thereafter, the isobutanol is removed by steam distillation, and an aqueous suspension of wax-coated pigment P.O. 72 is obtained. The aqueous suspension is homogenized by passing through a colloid mill. The homogeneous suspension is then sprayed in a spray tower having an airless high-pressure nozzle (gas inlet temperature: 260° C.; gas outlet temperature: 120° C.). Spherical pigment granules are obtained. The coloristic properties of the granules were tested in polyethylene and correspond to the powder type.

What is claimed is:

1. A process for the preparation of pigment granules comprising an azo pigment or a polycyclic pigment as an organic pigment, which comprises:
    adding a waxy polymer to the organic pigment during a finish process in
        an organic or aqueous organic medium comprising an organic solvent;
    removing the organic solvent from said organic or aqueous organic medium; forming an aqueous suspension comprising said organic pigment and water; and spray-drying the aqueous suspension to provide the pigment granules.

2. The process as claimed in claim 1, wherein removing the organic solvent comprises steam distillation or washing out with water.

3. The process as claimed in claim 1, wherein the polycyclic pigment is selected from the group consisting of an isoindolinone, isoindoline, anthanthrone, thioindigo, quinophthalone, anthraquinone, dioxazine, phthalocyanine, quinacridone, perylene, perinone, diketopyrrolopyrrole, azomethine pigment, and mixtures thereof.

4. The process as claimed in claim 1, wherein the waxy polymer is selected from the group consisting of a natural wax, a modified natural wax, a semisynthetic wax, a fully synthetic wax, an amide wax, a chlorine- or fluorine-containing polyolefin wax, and mixtures thereof.

5. The process as claimed in claim 4, wherein the fully synthetic wax is selected from the group consisting of a polyolefin wax, a cycloolefin copolymer wax, a polyethylene glycol wax, and mixtures thereof.

6. The process as claimed in claim 5, wherein the polyolefin wax is a polyolefin wax containing polar groups and formed by subsequent oxidation of the polyolefin wax, by a graft reaction with monomers containing carboxyl, carboxylic ester, carboxylic anhydride or hydroxyl groups or by copolymerization of an olefin and a onomer containing carboxyl, carboxylic ester, carboxylic anhydride or hydroxyl groups.

7. The process as claimed in claim 1, wherein the wax has a drop point of from 60 to 180° C.

8. The process as claimed in claim 1, wherein the wax has a drop point of from 80 to 140° C.

9. The process as claimed in claim 1, wherein the waxy polymer is selected from the group consisting of a thermoplastic polyester, epoxide, styrene-acrylate copolymer, styrene/butadiene copolymer, cycloolefin copolymer resin, and mixtures thereof.

10. The process as claimed in claim 1, wherein the organic pigment comprises from 50 to 99% by weight, and the waxy polymer comprises from 1 to 50% by weight, based on a total weight of the pigment granules.

11. The process as claimed in claim 1, wherein the organic pigment comprises from 6 to 95 by weight, and the waxy polymer comprises from 5 to 40% by weight, based on a total weight of the pigment granules.

12. The process as claimed in claim 1, wherein the finish process is carried out at a temperature of from 20 to 200° C.

13. The process as claimed in claim 1, wherein the finish process is carried out at a temperature of from 60 to 180° C.

14. The process as claimed in claim 1, wherein the organic solvent is selected from the group consisting of n-butanol, isobutanol, n-octanol, isooctanol, benzene, toluene, xylene, cresol, chlorobenzene, 1,2-dichlorobenzene, ethyl acetate, butyl acetate, methyl ethyl ketone, methyl isobutyl ketone, cyclohexanone, N-methylpyrrolidone, dimethyl sulfoxide, sulfolane, and mixtures thereof.

15. The process as claimed in claim 1, further comprising adding a surractant before or during the finish process.

16. A process for the preparation of pigment granules, which comprises:
    a) heating a finely divided organic pigment;
    b) adding a wax and an organic or aqueous organic medium comprising an organic solvent to the organic pigment during a finish process to evenly coat the organic pigment with said wax;

c) removing the organic solvent from said organic or aqueous organic medium;

d) forming an aqueous suspension comprising said organic pigment and water; and e) spray-drying the aqueous suspension at a spray drying temperature above a drop point of the wax to provide the pigment granules having a generally spherical shape.

17. The process of claim 16 further comprising adding a surfactant before or during the finish process of step(b).

18. The process of claim 17 wherein during the finish process, the organic pigment is first heated to a finish temperature, cooled to an intermediate temperature prior to adding the wax, and again heated to return the organic pigment to the finish temperature.

19. The process of claim 16 further comprising filtering the aqueous suspension prior to spray-drying.

* * * * *

UNITED STATES PATENT AND TRADEMARK OFFICE
CERTIFICATE OF CORRECTION

| | |
|---|---|
| PATENT NO. | : 6,485,558 B1 |
| APPLICATION NO. | : 09/649532 |
| DATED | : November 26, 2002 |
| INVENTOR(S) | : Metz et al. |

It is certified that error appears in the above-identified patent and that said Letters Patent is hereby corrected as shown below:

column 3, line 48, please delete "inorganic" and insert --organic-- in place thereof.

Signed and Sealed this

Eighth Day of August, 2006

JON W. DUDAS
*Director of the United States Patent and Trademark Office*